United States Patent [19]

Nelle

[11] Patent Number: 5,375,338
[45] Date of Patent: Dec. 27, 1994

[54] LENGTH MEASUREMENT DEVICE

[75] Inventor: Günther Nelle, Bergen, Germany

[73] Assignee: Dr. Johannes Heidenhain GmbH, Traunreut, Germany

[21] Appl. No.: 44,127

[22] Filed: Apr. 8, 1993

[30] Foreign Application Priority Data

Apr. 18, 1992 [DE] Germany ............................ 4212970

[51] Int. Cl.⁵ ............................................. G01B 11/04
[52] U.S. Cl. ........................................ 33/702; 33/704
[58] Field of Search ................. 33/702, 701, 703, 704, 33/705, 700, 706, 707, DIG. 19

[56] References Cited

U.S. PATENT DOCUMENTS

| 3,816,002 | 6/1974 | Wieg | 33/707 |
| 4,320,578 | 3/1982 | Ernst | 33/706 |
| 4,503,157 | 7/1985 | Nelle | 33/700 |
| 4,593,471 | 6/1986 | Nelle | 33/702 |
| 4,776,098 | 10/1988 | Nelle | 33/702 |
| 4,912,856 | 4/1990 | Ernst | 33/702 |
| 5,050,311 | 9/1991 | Nelle | 33/702 |
| 5,182,867 | 2/1993 | Nelle | 33/702 |

FOREIGN PATENT DOCUMENTS

| 3106701 | 9/1982 | Germany . | |
| 3243966 | 5/1984 | Germany . | |
| 1050061 | 12/1966 | United Kingdom | 33/702 |

Primary Examiner—Christopher W. Fulton
Attorney, Agent, or Firm—Anderson Kill Olick & Oshinsky

[57] ABSTRACT

A length measurement device for measuring the relative position of two objects is disclosed wherein a graduation on a scale carrier is scanned by a scanning unit for obtaining measured position values. The scale carrier is connected to a first fixed reference point within the measuring length in a rigid manner, and is connected with a carrier member so as to be longitudinally displaceable, for compensating for measurement errors which are caused by temperature variation. The carrier member is rigidly connected with a first object at a second fixed reference point within the measuring length and is connected so as to be longitudinally displaceable with the first object 1. The first fixed point and/or the second fixed point are changeable or movable within the measuring length.

7 Claims, 1 Drawing Sheet

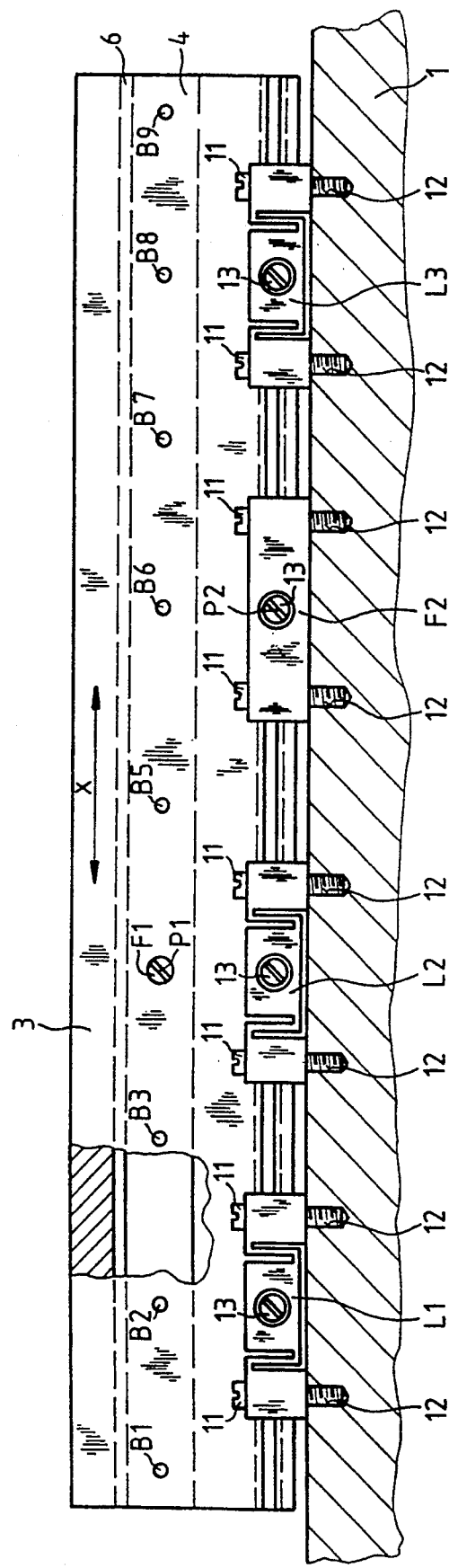
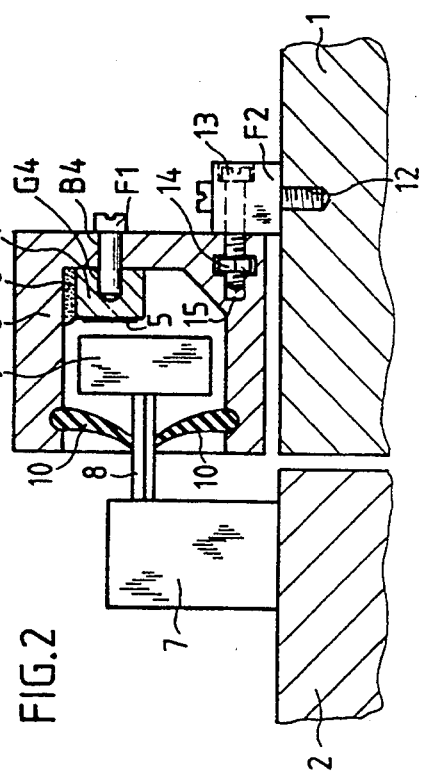
FIG.1
FIG.2

LENGTH MEASUREMENT DEVICE

FIELD OF THE INVENTION

The present invention pertains to a length measurement device for measuring the relative position of two objects.

BACKGROUND OF THE INVENTION

Length measurement devices are typically utilized with machine tools for measuring the relative position of a tool with respect to a machined workpiece. In length measurement devices, which are utilized in machines tools, there occur measurement inaccuracies and/or errors which result from graduation errors, machining flaws, and by measuring errors which are caused by temperature variations.

Compensation of these inaccuracies and/or errors, which are caused by temperature variations, is required since, generally, in spaces containing machine tools, the ambient temperature is generally not constant. Also, the temperatures of most machine tools change constantly during the course of the machining. Because of cost considerations, the scale carrier with the scale, the carrier member for the scale carrier, and the object to be measured, which is usually in the shape of the associated machine part, are formed only in the rarest cases, from materials which have the same thermal expansion coefficients. Therefore, the graduation carrier, the carrier member, and the machine part are subjected to different thermal length changes at these unavoidable temperature changes of the ambient temperature. In this regard, measurement inaccuracies can occur during the course of the machining of a workpiece. This, however, given the present requirements relating to machining accuracy of workpieces, is no longer acceptable. Very often glass is used for the scale carrier, aluminum is used for the carrier member, and steel or grey cast iron is used for the machine part.

A length measurement device is known from the DE-OS 32 43 966, wherein the scale carrier, which has a scale which is connected to the carrier member by means of an elastic adhesive layer, has a fixed measuring reference point as its center while being longitudinally displaceable on both its sides in the measuring direction in case of a temperature change. The carrier member is, on one hand, connected at both ends by a respective length compensation element which has attachment members which are rigidly fastened to a machine part which is to be measured and, on the other hand, is rigidly fastened to the machine part at its center by an additional fastening element, so that the scale carrier with the scale retains the fixed measuring reference point relative to the machine part at its center during temperature changes.

An arrangement for a length measurement device for a machine tool is disclosed in DE-PS 31 06 701, wherein an elongation element, of a material having a higher thermal expansion coefficient than that of the machine part, is fastened with one of its ends to the machine part and with its other end to a scale carrier, which has a scale for compensating for the thermal length changes of a machine part. The thermal length change of the elongation bar is equal to that of the machine part so that the length change of the machine part is identified by the measuring device.

The two above-identified length measuring devices are however, tailored respectively only to a specific temperature compensation in a machine tool and, therefore, are unsuitable for temperature problems of different kinds at different machine tools.

SUMMARY OF THE INVENTION

The present invention provides for a length measurement device which can be used for the solving of all temperature problems which occur with different machine tools. The present invention provides a length measurement device, for measuring the relative position of two objects, wherein the graduation of a graduation carrier, which is connected to a first object, is scanned by a scanning or probing unit, which is connected with a second object.

The scale carrier, having the scale, is rigidly connected with the carrier member at a first fixed reference point within the measuring length and is connected with the carrier member so as to be longitudinally displaceable. The carrier member is rigidly connected with the one object, in the second fixed reference point within the measuring length, and is connected with the object so as to be longitudinally displaceable. The first fixed reference point and/or the second fixed reference point can be changed or moved within the measuring length.

The advantages provided by the present invention consist, especially, in that the user is able to adapt the length measurement device to all temperature conditions which occur during actual practice with different machine tools during the course of different machining processes. This adaptation is performed in a simple manner so that length measurement devices, which are specifically adapted to different temperature conditions, are unnecessary.

Accordingly, it is an object of the present invention to provide for a length measurement device which can be used for the solving of all temperature problems which occur with different machine tools.

It is another object of the present invention to provide for a length measurement device for measuring the relative position of two objects, wherein the graduation of a graduation carrier, which is connected to a first object, is scanned by a scanning or probing unit, which is connected with a second object.

It is yet another object of the present invention to provide for a length measurement device which provides for the user's ability to adapt the device to all temperature conditions which occur during actual practice with different machine tools during the course of different machining processes.

Other objects and advantages of the present invention will be apparent to those persons skilled in the art upon a review of the Description of the Preferred Embodiment taken in conjunction with the Drawings which follow.

BRIEF DESCRIPTION OF THE DRAWINGS

In the drawings:

FIG. 1 illustrates a longitudinal view of an encapsulated length measurement device according to the invention; and FIG. 2 illustrates a cross-sectional view of the length measurement device of FIG. 1.

DESCRIPTION OF THE PREFERRED EMBODIMENT

FIGS. 1 and 2 illustrate a longitudinal view and a cross-sectional view, respectively, of an encapsulated length measurement device, which is the subject of the present invention and which is utilized for measuring the relative position of two objects 1,2. Inside the carrier member 3, which is in the form of a housing which is U-shaped in cross-section, a scale carrier 4, is disposed which has a graduation 5, which is connected by means of an elastic adhesive layer 6 to the carrier member 3, so as to be slightly longitudinally mobile in the measuring direction X as shown in FIG. 1, and which is also rigidly connected, by means of a first attachment element F1, at a fixed reference point P1, to the carrier member 3. The carrier member 3 is rigidly connected to the first object 1, which may have the form of a trolley of a machine tool (not shown), by means of a second attachment element F2, to a second fixed reference point P2 in a rigid manner and is supported by means of three length compensation elements L1, L2 and L3 for a longitudinal displacement in the measuring direction X.

As illustrated in FIG. 2, a mounting member 7 is fastened to the second object 2, which may be in the form of a bed of the aforementioned machine tool. The mounting member 7 is connected to a scanning unit 9 by means of a twin sword-shaped driver 8. The scanning unit 9 scans the scale 5, which is situated on the scale carrier 4, inside the carrier member 3, in order to obtain positional measurement values for the relative position of the two objects 1, 2. The inside of the carrier member 3 is protected against environmental influences by means of two sealing lips 10 which slope in a roof-shaped manner. The lips rest at the twin sword-shaped driver 8.

For the compensation of temperature-caused measuring errors in the positional measurement values, which result from the respective temperature behavior of the machine tool, the first fixed reference point P1, between the scale carrier and the carrier member 3, can be changed by providing a row of bores B1–B9 in the carrier member 3, and further, by providing correspondingly threaded bores G1–G9 in the scale carrier 4 for the first attachment element F1, which may typically be in the form of a screw. The first attachment element F1 fixes or determines the measuring reference point of the scale 5 of the scale carrier 4 relative to the carrier member 3 at a respectively selected first fixed reference point P1.

For the compensation of temperature-caused measuring errors, the second fixed referenced point P2, between the carrier member 3 and the first object 2, can also be changed. The second attachment element F2 consists of a four-cornered metal piece, which is rigidly fastened in the two end regions to the first object by screws 11 and threaded bores 12. Further, the second attachment element F2 is rigidly connected to the carrier member 3, in the central regions, by means of a screw 13 and a nut 14 in a groove 15 of the carrier member 3.

The length compensation elements L1, L2 and L3 are also connected by the same elements with the first object 1 and the carrier member 3. These length compensation elements L1, L2, and L3 each consist of the same four-cornered metal pieces as does the second attachment element. However, the four-cornered metal piece which forms the length compensation element, differs from that which forms the second attachment element in that it has, respectively, one elastic region with meandering incisions between the central region and the two end regions, so that a longitudinal displacement of the carrier member 3, relative to the first object 1, is possible in the measuring direction.

The two fixed reference points P1 and P2 can be located in a plane, which is perpendicular to the measuring direction X, and for instance, can be at the beginning, at the end, or at the middle, of the measuring region. The two fixed reference points P1 and P2 can also have specific mutual spacings in the measuring direction X, so that the carrier member 3 fulfills the function of an elongation element, and further so that the length change of a machine part can be determined by the length measurement device.

The length scale can also be supported on an additional scale carrier, which may, for example, be made of glass. This additional scale carrier can be connected to the scale carrier 4, such as for example, by an elastic adhesive layer or by a rigid adhesive layer.

While the present invention has been described in a preferred embodiment, such description is merely illustrative of the present invention and is not to be construed as a limitation thereof. In this regard, the present invention is meant to encompass all modifications, variations and/or alternate embodiments with the scope of the present invention limited only by the claims which follow.

What is claimed is:

1. A length measuring device for measuring a relative position of two objects, said device comprising:
   a carrier member having means defining first and second reference points each having a variable position along a length of said carrier member;
   a scale carrier having a graduation;
   first means for connecting said scale carrier with said carrier member with a possibility of a longitudinal displacement of said scale carrier and said carrier member relative to each other in a measurement direction;
   second means for rigidly connecting said scale carrier with said carrier member at the first reference point;
   third means for connecting said carrier member with one of said two objects with a possibility of a longitudinal displacement of said carrier member with the one of the two objects in the measurement direction;
   fourth means for rigidly connecting said carrier member with the one of the two objects at the second reference point;
   a device for scanning said graduation; and
   fifth means for rigidly connecting said scanning device with another of the two objects.

2. A length measuring device according to claim 1, wherein said first and second reference points defining means comprises a row of spaced openings arranged along the length of said carrier member, and wherein said second means comprises a row of openings arranged along said scale carrier and corresponding to said row of openings along the length of said carrier member, and an attachment member for extending through a respective opening of said row of openings arranged along said scale carrier and through a selected one of said row of openings arranged along said carrier member and defining the first reference point for rigidly connecting said scale carrier with said carrier member at the first reference point.

3. A length measuring device according to claim 1, wherein said first means comprises an elastic adhesive layer with which said scale carrier is connectable with said carrier member.

4. A length measuring device according to claim 1, wherein said first and second reference points defining means comprises a continuous slot formed in said carrier member, and wherein said fourth means comprises a member for fixidly connecting said carrier member with the one of the two objects at a selected point taken along said continuous slot and defining the second reference point.

5. A length measuring device according to claim 1, wherein said third means comprises length compensation means for attaching said carrier member to the one of the two objects.

6. A length measuring device according to claim 1, wherein one of said first and second reference points is incrementally variable and another of said first and second reference points is continuously variable.

7. A length measuring device according to claim 1, wherein each of said first and second reference points is one of incrementally variable and continuously variable.

* * * * *